(12) United States Patent
Channapragada et al.

(10) Patent No.: US 11,516,347 B2
(45) Date of Patent: Nov. 29, 2022

(54) SYSTEMS AND METHODS TO AUTOMATICALLY JOIN CONFERENCE

(71) Applicant: Rovi Guides, Inc., San Jose, CA (US)

(72) Inventors: Srikanth Channapragada, Bangalore (IN); Vikram Makam Gupta, Bangalore (IN); Pooja Srivastava, Bengaluru (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 16/916,904

(22) Filed: Jun. 30, 2020

(65) Prior Publication Data

US 2021/0409547 A1 Dec. 30, 2021

(51) Int. Cl.
| | |
|---|---|
| *H04M 3/00* | (2006.01) |
| *H04M 5/00* | (2006.01) |
| *H04M 3/56* | (2006.01) |
| *H04L 65/403* | (2022.01) |
| *H04N 7/15* | (2006.01) |
| *H04L 12/18* | (2006.01) |
| *H04L 12/66* | (2006.01) |

(52) U.S. Cl.
CPC ........ *H04M 3/568* (2013.01); *H04L 12/1827* (2013.01); *H04L 65/403* (2013.01); *H04M 3/567* (2013.01); *H04N 7/15* (2013.01)

(58) Field of Classification Search
CPC ............. H04M 2201/41; H04M 3/385; H04M 3/42221; H04M 3/2218; H04M 2203/6054; H04M 2201/40; H04M 3/42068; H04M 3/4211; H04M 3/493; H04M 3/56; H04M 3/42348; H04M 3/42357; H04L 63/0861; H04L 9/3231; H04L 63/10; H04L 2463/082; H04L 12/1818; H04L 12/1831; H04L 63/08; H04L 65/403; H04L 9/3247; H04L 67/10; H04W 12/06; H04W 12/08; H04W 12/72; G06F 21/32; G06Q 20/305; G06Q 20/40145
USPC ....... 379/88.02, 142.05, 202.01; 704/17.002, 704/17.003; 340/5.82, 5.8; 370/261
See application file for complete search history.

(56) References Cited

U.S. PATENT DOCUMENTS

| | | | |
|---|---|---|---|
| 7,451,078 B2 | 11/2008 | Bogdanov | |
| 7,853,344 B2 | 12/2010 | Khan | |
| 8,781,841 B1* | 7/2014 | Wang | H04M 3/56 704/275 |
| 10,324,940 B2 | 6/2019 | Venkataraman et al. | |
| 10,621,970 B2 | 4/2020 | Mehra | |
| 2002/0101918 A1* | 8/2002 | Rodman | H04M 3/56 375/224 |

(Continued)

*Primary Examiner* — Kharye Pope
(74) *Attorney, Agent, or Firm* — Haley Guiliano LLP

(57) ABSTRACT

Systems and methods are described to enable a device of a user to automatically join an ongoing conference, where the device is not currently joined to the conference. A first audio signature is generated based on voices of users already in the conference, and a second audio signature is generated based on an audio signal captured by a microphone of the device associated with the first user when the device associated with the first user was not joined to the conference. The first audio signature and the second audio signature are compared, and in response to determining that first audio signature matches the second audio signature, the device associated with the first user is joined to the conference.

20 Claims, 7 Drawing Sheets

(56) References Cited

U.S. PATENT DOCUMENTS

| | | | |
|---|---|---|---|
| 2003/0125954 A1* | 7/2003 | Bradley | H04M 3/569 704/270 |
| 2005/0213739 A1* | 9/2005 | Rodman | H04M 3/567 379/202.01 |
| 2008/0118042 A1* | 5/2008 | Hogg | H04M 3/2281 379/93.03 |
| 2008/0181140 A1* | 7/2008 | Bangor | H04L 12/1818 370/261 |
| 2012/0269335 A1* | 10/2012 | Goguen | H04L 63/10 379/202.01 |
| 2012/0308044 A1* | 12/2012 | Vander Mey | H04L 12/1822 381/104 |
| 2015/0012270 A1* | 1/2015 | Reynolds | G11B 27/19 704/233 |
| 2015/0098556 A1* | 4/2015 | Mathur | H04M 1/271 379/88.02 |
| 2015/0103991 A1* | 4/2015 | Albert | H04M 3/382 379/202.01 |
| 2016/0284354 A1* | 9/2016 | Chen | H04N 7/147 |
| 2017/0076749 A1* | 3/2017 | Kanevsky | G10L 25/51 |
| 2019/0318743 A1* | 10/2019 | Reshef | G10L 17/06 |
| 2019/0391788 A1 | 12/2019 | Blake et al. | |
| 2020/0186893 A1 | 6/2020 | Sanchez et al. | |
| 2020/0312337 A1* | 10/2020 | Stafylakis | G10L 15/08 |
| 2021/0105358 A1* | 4/2021 | Jolly | G10L 17/04 |

\* cited by examiner

SYSTEMS AND METHODS TO AUTOMATICALLY JOIN CONFERENCE

BACKGROUND

This disclosure is directed to enabling a device of a user to automatically join an ongoing conference, where the device is not currently joined to the conference. In particular, such a device is enabled to join the conference based on whether an audio signature associated with a plurality of voices of users already in the conference matches an audio signature generated based on an audio signal captured by a device associated with the user.

SUMMARY

Advancements in communication technology have improved the ability of users to communicate (e.g., such as via video conferencing) with colleagues, family and friends located in a different physical location than the user. For example, conferencing systems (e.g., Microsoft Teams™, Zoom™, etc.) are often used to enable colleagues in separate, geographically distributed physical locations to have a face-to-face conversation via a video conference. In some circumstances, multiple devices in a single location may be joined to a conference (e.g., in a physical conference room at an office), and other users in different geographical locations may also be participating in the conference over a network. However, having multiple devices joined to a conference in the same physical location may cause several issues. For example, audio feedback (e.g., a high-pitched screech or squeal) may be created if a signal received by a microphone of one of the devices is fed to a speaker, and such signal is output by the speaker and again received by the microphone. Such audio feedback can be distracting and irritating to users participating in the conference. In addition, although a user may be present at the conference, it may be the case that the user is in a conference room with multiple users participating in the conference via a single device joined to the conference. In this situation, other conference participants may be unaware the user is participating in the conference (e.g., if an icon associated with the user is not presented on a display associated with the conference call). Moreover, there may no record of the user having participated in the conference.

In one approach, a user may manually select an option to join a conference and select a mute option presented on a display of his or her device, in order to avoid audio feedback. However, this may be burdensome for the user. In particular, the user may not know a conference ID that may be required to join the conference. Additionally, there may be a delay between joining the conference and the audio being muted. In this circumstance, other users may be subjected to undesirable audio feedback while the user is attempting to mute his or her device. Alternatively, the user may decide not to bring his or her device to the conference room, and thus other users joined to the conference (e.g., over the network and not present in the conference room) may not recognize that the user is participating in the conference.

To overcome these problems, systems and methods are provided herein for automatically joining a device associated with a first user to a conference of a plurality of users when the user is proximate to another device already joined to the conference. A conferencing server may generate (and store) a first audio signature based on voices of the plurality of users already in the conference. Later, a new device that is not joined to the conference attempts to join the conference and may capture a sample of ambient sounds using a microphone. In some embodiments, the new device locally generates a second audio signature based on the ambient sample and transmits the second audio signature to the server. In some embodiments, the new device sends the ambient sounds to the conferencing server, allowing the server to generate the second signature. In response to determining that first audio signature matches the second audio signature, the device associated with the first user is joined to the conference.

In some aspects of the disclosure, the audio signal captured by the microphone of the device associated with the first user comprises at least one of the voices of the plurality of users in the conference. For example, a conferencing application may determine whether the device associated with the first user is in a same physical location as a device associated with at least one user of the plurality of users in the conference, and the audio signal captured by the microphone of the device associated with the first user may be captured in response to determining that the device associated with the first user is in a same physical location as the device associated with the at least one user. In some embodiments, the device may attempt to join in response to a request (e.g., via a user interface) to join a conference. For example, the user may say "Join current conference," or click or touch a button labeled "Join current conference."

The joining of the device associated with the first user to the conference may comprise generating for presentation an icon indicating to each user joined to the conference that the first user is joined to the conference. In this way, other users participating in the conference (e.g., over the network and not present in a conference room with the first user) may be made aware that the user is participating in the conference. In addition, after the device associated with the first user is joined to the conference, the conferencing application may cause the microphone and a speaker of the device associated with the first user to be automatically muted without receiving a user command to mute the microphone and the speaker. Accordingly, audio feedback that may be distracting and irritating to users in the conference can be avoided.

In some aspects of the disclosure, the conferencing server may assign a conference identifier to the conference, and associate a first audio signature with the conference identifier, and joining the device associated with the first user to the conference may comprise transmitting the conference identifier to the device associated with the first user.

In some embodiments, the first audio signature and the second audio signature are generated by sampling the voices of the plurality of users in the conference and the audio signal captured by the microphone, respectively, at regular intervals. The first audio signature and the second audio signature may also be generated by transcribing the voices of the plurality of users in the conference and the audio signal captured by the microphone, respectively, into text.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
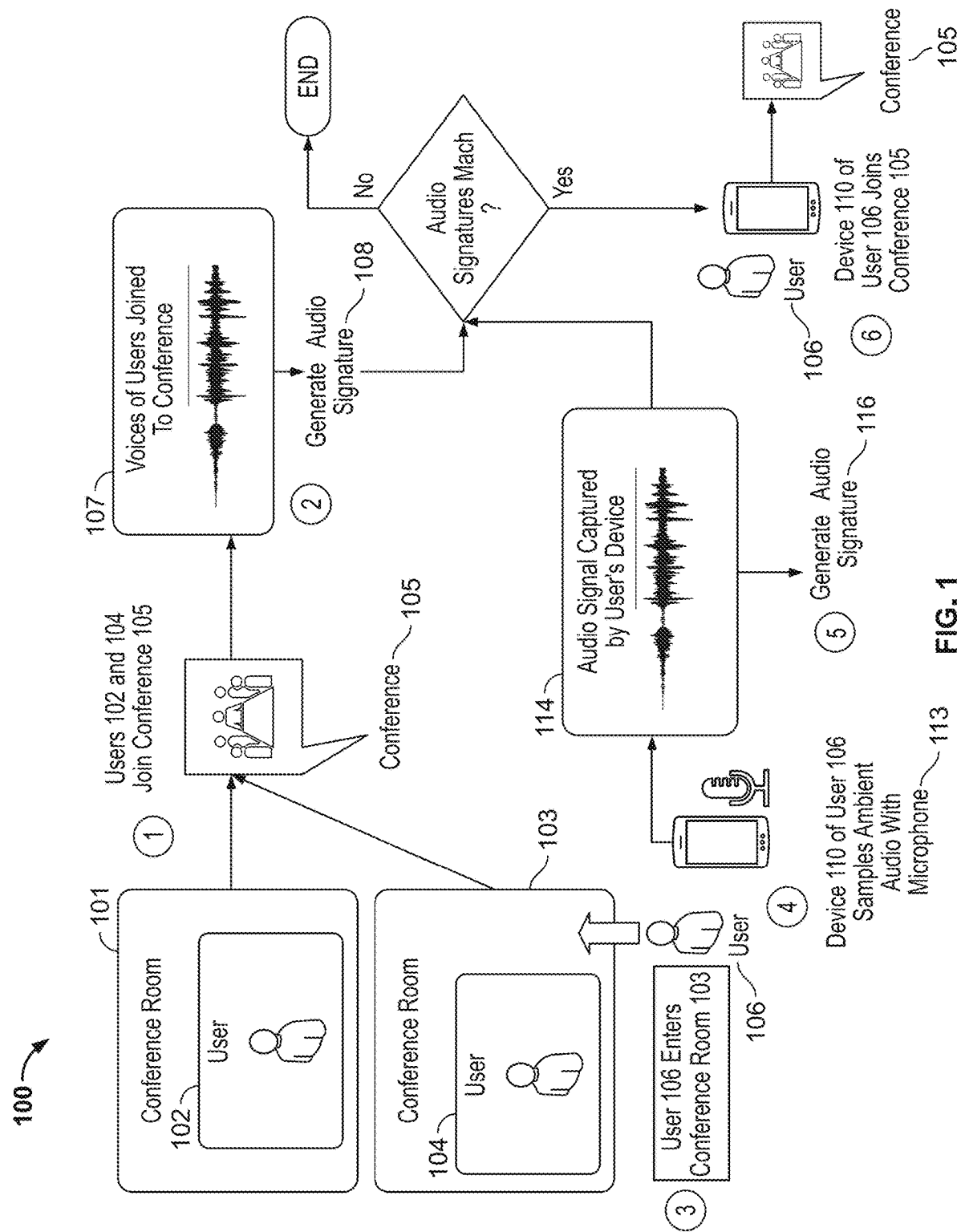
FIG. 1 shows an example of joining a device associated with a user to a conference, in accordance with some embodiments of this disclosure.

FIG. 1 shows an example 100 of joining a device associated with user 106 to conference 105. In some embodiments, a conferencing application joins users to a video and/or audio conference to enable communication with other users over a network. For example, the conferencing application joins a device associated with user 102, and a device associated with user 104, to conference 105), and users 102 and 104 may be located in different geographical locations (e.g., user 102 may be present in conference room 101 located in New York, while user 104 may be present in conference room 103 located in California). Once users 102 and 104 join the conference, the conferencing application may enable the users to communicate with one another (e.g., via audio, video and/or text message) using one or more digital devices. The voices 107 of users 102 and 104 may be detected (e.g., by respective microphones of conferencing devices located in conference rooms 101 and 103), and the conferencing application may generate (e.g., locally or at a conferencing server) an audio signature based on such detected voices. The generated audio signatures may be stored at the conferencing server (e.g., server 508 in FIG. 5) in association with a conference ID. The signature may be generated using a suitable voice processing technique (e.g., as described in FIG. 2).

The conferencing application may then determine that user 106 (whose device is not yet joined to the conference), associated with device 110 (e.g., a mobile device held by the user 106, and running the conferencing application), has physically entered conference room 103 (or otherwise became proximate to conference Room 103), in which user 104 is already participating in conference 105. Such determination may be performed in any suitable manner (e.g., as discussed in more detail in FIG. 3). Once the conferencing application determines that user 106 has entered conference room 103, microphone 113 of device 110 associated with user 106 may be triggered to begin detecting ambient audio. For example, the microphone 113 may detect the voices of user 102 (e.g., over the network) and user 104 (e.g., in person in conference room 103) participating in the conference, and sample the detected voices of user 102 and user 104. The conferencing application may generate (e.g., locally or at a conferencing server) an audio signature 116 based on the detected ambient audio signal 114. The conferencing server may receive the generated audio signature 116, and the conferencing application may compare audio signature 116 to the generated audio signature 108. If the conferencing application determines that audio signature 116 matches audio signature 108, device 110 of user 106 may be joined to conference 105, to enable the user 106 to communicate over the network with user 102, located in a different physical location from user 106. In some embodiments, the microphone of device 110 may be automatically muted (e.g., without receiving further user input), after device 110 of user 106 is joined to conference 105, thereby minimizing or avoiding audio feedback. If the conferencing application determines that audio signature 116 does not match audio signature 108, the conferencing application may determine that user 106 should not be joined to conference 105. This may be advantageous for various reasons (e.g., to avoid joining a device of a user to the conference in a circumstance where the user may have happened to walk by a conference room but did not intend to (or was not invited to) join the conference, thereby conserving network and/or device resources).

In some embodiments, the microphone 113 of the device 110 may be triggered in response to the conferencing application receiving a request to join from the user (e.g., via a selectable option on a user interface of the device, via voice command, etc.). For example, the conferencing application may detect that a new device (e.g., device 110) is attempting to join the conference 105, and the conferencing application may trigger a microphone of a device (e.g., a device associated with user 102) of a user known to be joined to the conference, as well as the microphone of the device attempting to join the conference. The conferencing application may generate audio signatures based on the captured audio of the microphone 113 of the device 110 and the captured audio of the device associated with user 102, and join the device 110 to the conference 105 upon determining the audio signatures match.

Figure 2:
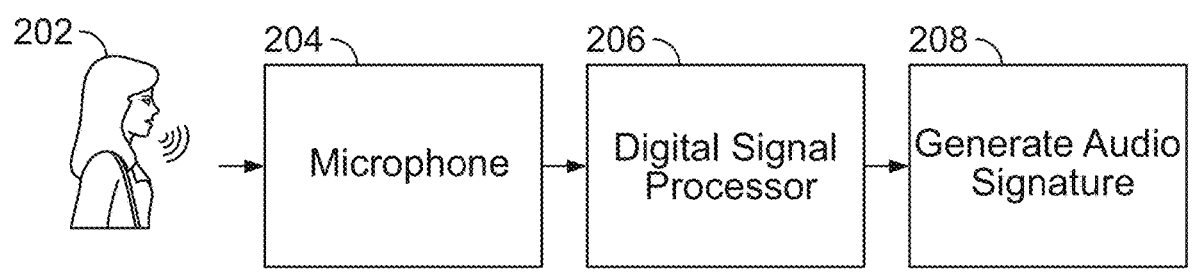
FIG. 2 shows an example of generating an audio signature, in accordance with some embodiments of this disclosure.

FIG. 2 shows an exemplary process of generating an audio signature. As referred to herein, the term "audio signature" or "audio fingerprint" may refer to any kind of a digital or analog representation of a sound. The audio signature may be a digital measure of certain acoustic properties that is deterministically generated from an audio signal and may be used to identify an audio sample and/or quickly locate similar items in an audio database. For example, an audio signature may be a file, data, or data structure that stores time-domain sampling of an audio input. In another example, an audio signature may be a file, data, or data structure that stores a frequency-domain representation (e.g., a spectrogram) of an audio input. Exemplary generation of audio signatures is described in greater detail in Blake et al., U.S. Patent Application Publication No. 2019/0391788 A1, filed Jun. 26, 2018; Sanchez et al., U.S. Patent Application Publication No. 2020/0186893 A1, filed Feb. 12, 2020; Khan et al., U.S. Pat. No. 7,853,344, issued Dec. 14, 2010; and Bogdanov, U.S. Pat. No. 7,451,078, issued Nov. 11, 2008, which are hereby incorporated by reference herein in their entireties.

As shown in FIG. 2, microphone 204 may receive audio input 202 (e.g., a voice of a user in the conference, background noise, music, recorded audio, and/or other suitable audio signals), and convert audio input 202 into an electrical signal. The detected audio input 202 may include frequencies in a range of 20 Hz to 20 kHz (e.g., the sound wave frequency that may be heard by the human ear). In some embodiments, audio input 202 may be sampled at regular intervals (e.g., periods of 1-2 seconds with samples taken every few milliseconds during the period). For example, audio input 202 may be various segments of the audio of the conference. The electrical signal output by the microphone 204 may be an analog output, and may be digitized at digital signal processor 206 to facilitate further processing. In some embodiments, the microphone 204 may be a MEMS microphone with a digital output.

The digital signal processor 206 (e.g., included in a general-purpose microprocessor or a specialized digital signal processor) may perform various operations on the received digital signal. In some embodiments, the digital signal processor 206 may perform a fast Fourier transform operation on time-domain samples of the audio to produce a frequency-domain representation of the audio. In some embodiments, the digital signal processor 206 may employ audio compression techniques, to reduce network resources and/or computing power to process the signal. In some embodiments, noise reduction techniques may be employed (e.g., in a pre-processing stage) to filter out unwanted signals.

The generated audio signature 208 may comprise a time-domain and/or frequency-domain representation (e.g., a spectrogram) of the signal. In some embodiments, the device (e.g., device 110 of FIG. 1) associated with the user (e.g., user 106 of FIG. 1) may transmit an encoded time-domain representation of the signal to a server and receive and decode a frequency-domain representation of the signal. In some embodiments, digital signal processing including frequency analysis, peak volume detecting, audio hashing, waveform matching, and/or any other digital signal processing method known to those skilled in the art may be used to generate an audio signature. As another example, the audio signature may comprise an audio signature or hash calculation deterministically generated from a predefined portion of the audio signal.

In some embodiments, the conferencing application may generate a features vector based on the output of the digital signal processor 206, and audio signature 208 may correspond to such features vector. For example, the features vector may comprise a sequence of values representing various audio or acoustic features or characteristics (e.g., amplitude, modulation, tone, frequency, volume, speed, etc.) of the signal. Audio processing circuitry may analyze audio characteristics of the signal to identify audio signatures using any suitable audio analysis technique (e.g., frequency analysis to determine a base frequency and unique harmonic pattern of a particular voice, phoneme analysis to determine an accent of a particular voice, etc.). For example, the wave amplitude of the audio signal may be used to determine the volume of the voice of user 202 and/or analyze frequency data to determine the pitch and tone of the voice search query. The audio processing circuitry may also identify non-vocal audio such as music, sound effects, and the like using similar frequency analysis techniques or any other suitable method of audio analysis. The identified audio characteristics may be stored in association with a timestamp of when the audio signal was received. Audio signal processing is discussed in more detail in U.S. patent application Ser. No. 16/553,410, filed Aug. 28, 2019, which is hereby incorporated by reference herein in its entirety.

In some embodiments, the audio signal may be converted to transcribed text, and such text may be used to generate audio signature 208. For example, the conferencing application may transcribe the audio response into a string of text (e.g., by any suitable automatic speech recognition technique), or transcription of the audio signal may be achieved by external transcription services (e.g., Amazon Transcribe by Amazon, Inc. of Seattle, Wash. and Google Speech-to-Text by Google, Inc. of Mountain View, Calif.). The transcription of audio is discussed in more detail in U.S. patent application Ser. No. 16/397,004, filed Apr. 29, 2019, which is hereby incorporated by reference herein in its entirety.

Figure 3:
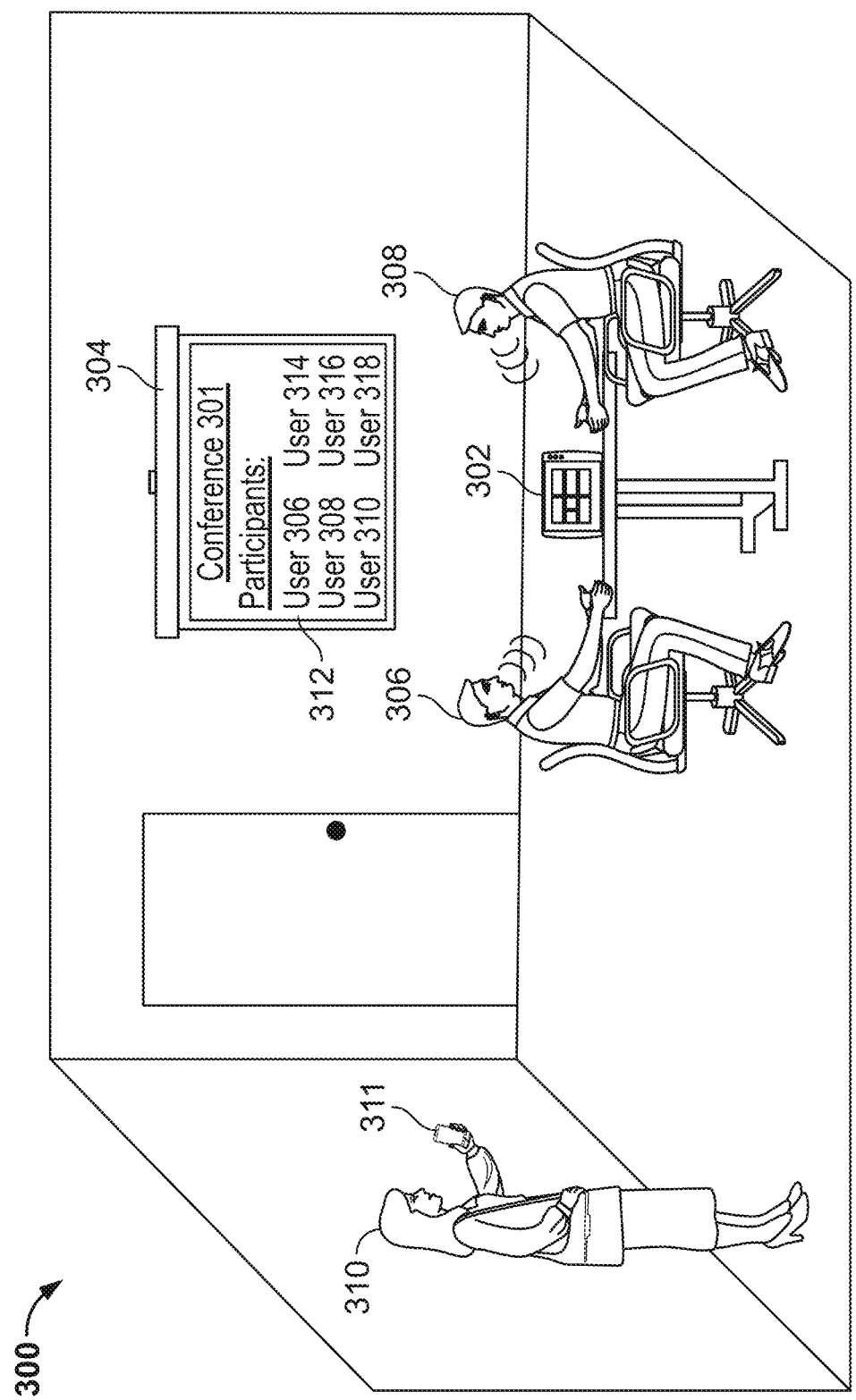
FIG. 3 shows an example of a user entering a conference room in which users are participating in a conference, in accordance with some embodiments of this disclosure.

FIG. 3 shows an example of joining a user 310 to an ongoing conference 301. Users 306, 308 are depicted as physically present in conference room 300, and each of users 306 and 308 are already joined to the conference and communicating via conferencing device 302 with other conference participants located in different physical locations. The conferencing device 302 may include a camera and a microphone to facilitate communication between the users present in conference room 300 and users located in other physical locations (e.g., users 314, 316, 318). In some embodiments, the conferencing application may display a video feed of such users 314, 316, 318 at projector screen 304, and/or icons 312 for each user, to indicate which users are participating in the conference. The conferencing application may also display a video feed of the conference room 300 to users 314, 316 and 318 in their respective locations via their respective devices, and the video feed of the users 314, 316 and 318 (and the conference room 300) may also be presented on projector screen 304.

When the user 310 enters conference room 300, the conferencing application (e.g., running at least in part on device 311 associated with the user 310) may activate the microphone of device 311 to capture sound in the conference room 300. For example, in order to optimally utilize network and/or device resources, it may be desirable for the conferencing application to be activated (e.g., begin sampling ambient audio) only upon determining the user has entered a physical conference room where devices associated with the conference are located. The conferencing application may determine that the user 310 has entered the conference room 300 using any suitable method.

In some embodiments, the conferencing application may determine that the user has entered the conference room 300 based on GPS data retrieved from device 311, or based on an IP address associated with device 311, to determine the user's geographic location. For example, the conferencing application may compare GPS coordinates associated with device 311 to GPS coordinates or IP address information associated with devices currently joined to the conference (e.g., stored at a conferencing server). If the comparison indicates that the user 310 is in the same location as device 302 (e.g., within a predetermined threshold distance, such as 10-20 feet), the conferencing application may determine that the user 310 has entered conference room 300. As another example, the conferencing application may determine whether device 311 is within a threshold distance of device 302 based on a wireless signal strength between the devices (e.g., polling nearby devices). For example, the conferencing application may determine a relative received signal strength indicator (RSSI) of a wireless signal between device 311 and the conferencing device 302, and based on the RSSI, an estimated distance between device 311 and device 302 (e.g., using a lookup table that returns distance as a function of RSSI). In another example, the conferencing application may measure received radio frequency (RF) power over a shared wireless signal to estimate a location of the user. As another example, the conferencing application may employ any suitable computer vision or facial recognition techniques (e.g., on an image or video feed of a camera of a device already joined to an ongoing conference or of a device not yet joined to the conference) to recognize a user to be added to an ongoing conference.

In some embodiments, the conferencing application may determine that the user has entered the conference room 300 by polling other devices joined to the conference, to determine whether the user 310 and device 311 are in the vicinity of a threshold number of devices (e.g., five devices) joined to the conference. As another example, the conferencing application may monitor a smart lock or an RFID chip in the user's mobile phone to determine whether the user has entered a conference room or physical location where conference participants are located. In some embodiments, the conferencing system may monitor the location of device 311 during the conference, and upon determining that device 311 has left the conference room 300, may automatically remove the user 310 from the conference (and remove any indicators that the user is still participating in the conference). In some embodiments, a selectable option on the device 311 may be selected by the user 310 to attempt to join the current conference (e.g., conference 301). The conferencing application may then confirm that the device 311 is within a predetermined proximity to other devices participating in the conference (e.g., prior to triggering microphones of the devices to capture audio, and generating audio signatures based on the captured audio).

When the conferencing application determines that device 311 associated with user 310 has entered the conference room 300, the microphone of device 311 may be activated to sample ambient audio in the conference room 300. It should be noted that the determination may be based on proximity to other devices joined to the conference, and may not be room related or based on entering a particular room. In some embodiments, the microphone may be configured to capture audio of only the users within the conference room 300 where device 311 is located, or alternatively capture audio of both the conference room 300 and audio over the network (e.g., received from one or more devices associated with users 314, 316, 318). As discussed in connection with FIG. 1, and as discussed in more detail below, the conferencing application (e.g., at device 311 or at a conferencing server) may generate an audio signature based on the ambient audio detected by device 311, and may join the user to the conference upon determining that such generated audio signature matches audio signatures stored at the conferencing server (e.g., and which are associated with a conference ID of the conference). In some embodiments, when the user 310 is joined to the conference, the conferencing application may cause the microphone, camera and/or speaker of device 311 to be automatically muted and/or disabled, to avoid subjecting other conference participant's to audio feedback, and may cause the display of an icon on projector 304 indicating to all conference participants that the user 310 is now participating in the conference.

Figure 4:
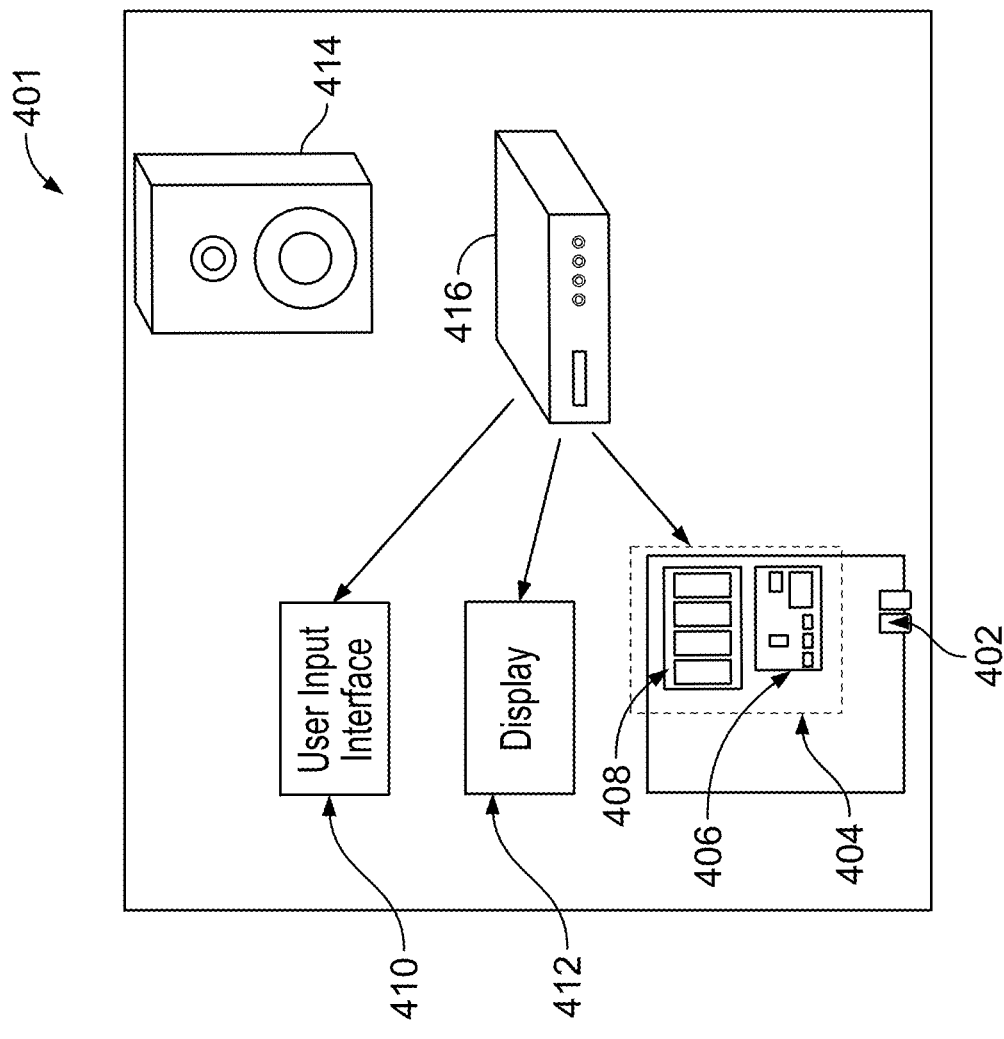
FIG. 4 is a diagram of illustrative conferencing devices, in accordance with some embodiments of this disclosure.
Figure 4:
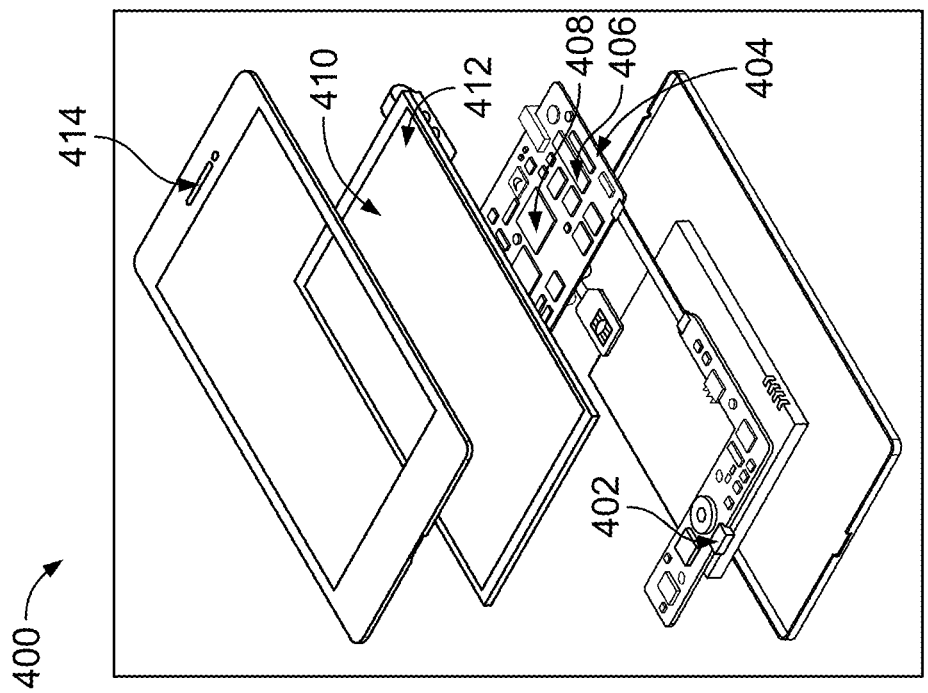

FIG. 4 shows generalized embodiments of illustrative conferencing devices 400 and 401. Any of the devices discussed in connection with FIGS. 1-3 may be implemented as conferencing devices 400 or 401. The conferencing application may be executed on any combination of conferencing device 400 and/or device 401 (e.g., locally) and/or conferencing server 508 (e.g., remotely) of FIG. 5, and the steps illustrated in FIGS. 1-3 may be performed by the conferencing application locally or remotely. As depicted, conferencing device 400 may be a smartphone or tablet, whereas conferencing device 401 may be a conferencing system that includes equipment device 416 (e.g., a PC, set-top box, CPU, video-game console, etc.). Conferencing devices 400 and 401 may receive content and data via input/output (hereinafter "I/O") path 402 (e.g., I/O circuitry). I/O path 402 may provide content (e.g., Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O path 402 may additionally provide circuitry to control user interface 410. I/O functions may be provided by one or more of these communications paths but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a conferencing system stored in memory (e.g., storage 408). Specifically, control circuitry 404 may be instructed by the conferencing system to perform the functions discussed above and below.

In client-server-based embodiments, control circuitry 404 may include communications circuitry suitable for communicating with a conferencing system server (e.g., server 508 of FIG. 5) or other networks or servers. The instructions for carrying out the above-mentioned functionality may be stored on a server. Communications circuitry may include a cable modem, an integrated service digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of conferencing devices, or communication of conferencing devices in locations remote from each other.

As referred to herein, the phrase "conferencing device" and "user device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a personal computer (PC), a laptop computer, a tablet, a WebTV box, a smart phone, or any other television equipment, computing equipment, or wireless device, and/or combination of the same.

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Non-volatile memory may also be used (e.g., to launch a boot-up routine and other instructions). Cloud-based storage, described in relation to FIG. 5, may be used to supplement storage 408 or instead of storage 408.

Control circuitry 404 may include audio circuitry, video circuitry, and tuning circuitry, such as one or more analog tuners, one or more MP4 decoders or other digital decoding circuitry, or any other suitable tuning or audio circuits or combinations of such circuits. Encoding circuitry (e.g., for converting over-the-air, analog, or digital signals to audio signals for storage) may also be provided. Control circuitry 404 may also include scaler circuitry for upconverting and downconverting content into the preferred output format of the conferencing device 400. Circuitry 404 may also include digital-to-analog converter circuitry and analog-to-digital converter circuitry for converting between digital and analog signals. The tuning and encoding circuitry may be used by the conferencing device to receive and to display, to play, or to record content. The tuning and encoding circuitry may also be used to receive guidance data. The circuitry described herein, including, for example, the tuning, audio-generating, encoding, decoding, encrypting, decrypting, scaler, and analog/digital circuitry, may be implemented using software running on one or more general purpose or specialized processors. Multiple tuners may be provided to handle simultaneous tuning functions. If storage 408 is provided as a separate device from user device 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touchscreen, touchpad, stylus input, joystick, voice recognition interface, or other user input interfaces. Display 412 may be a touchscreen or touch-sensitive display. In such circumstances, user input interface 410 may be integrated with or combined with display 412. Display 412 may be provided as a stand-alone device or integrated with other elements of each one of conferencing device 400 and device 401. Speakers 414 may be provided as integrated with other elements of each of conferencing device 400 and device 401. In the case of conferencing device 401, speakers 414 may be stand-alone units (e.g., smart speakers). The audio component of videos and other content displayed on display 412 may be played through speakers 414. In some embodiments, the audio may be distributed to a receiver (not shown), which processes and outputs the audio via speakers 414.

The conferencing application may be implemented using any suitable architecture. For example, it may be a stand-alone application wholly implemented on conferencing device 400 and/or 401. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the conferencing application is a client/server-based application. Data for use by a thick or thin client implemented on device 400 or device 401 may be retrieved on-demand by issuing requests to a server (e.g., conferencing server 508 of FIG. 5) remote to the device 400 or device 301. In one example of a client/server-based conferencing application, control circuitry 404 runs a web browser that interprets web pages provided by a remote server (e.g., conferencing server 508). For example, the remote server may store the instructions for the application in a storage device. The remote server may process the stored instructions using circuitry (e.g., control circuitry 404) and generate the displays discussed above and below. The user device may receive the displays generated by the remote server and may display the content of the displays locally on device 400 or device 401. This way, the processing of the instructions is performed remotely by the server while the resulting displays are provided locally on device 400 or device 401. Device 400 or device 401 may receive inputs from the user via input interface 410 and transmit those inputs to the remote server for processing and generating the corresponding displays. For example, on device 400 or device 401 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to device 400 or device 401 for presentation to the user.

In some embodiments, the conferencing application is downloaded and interpreted or otherwise run by an interpreter or virtual machine (run by control circuitry 404). In some embodiments, the application may be encoded in the ETV Binary Interchange Format (EBIF), received by control circuitry 404 as part of a suitable feed, and interpreted by a user agent running on control circuitry 404. For example, the application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the application may be, for example, encoded and transmitted in an MPEG-2 object carousel with the MPEG audio and video packets of a program.

Figure 5:
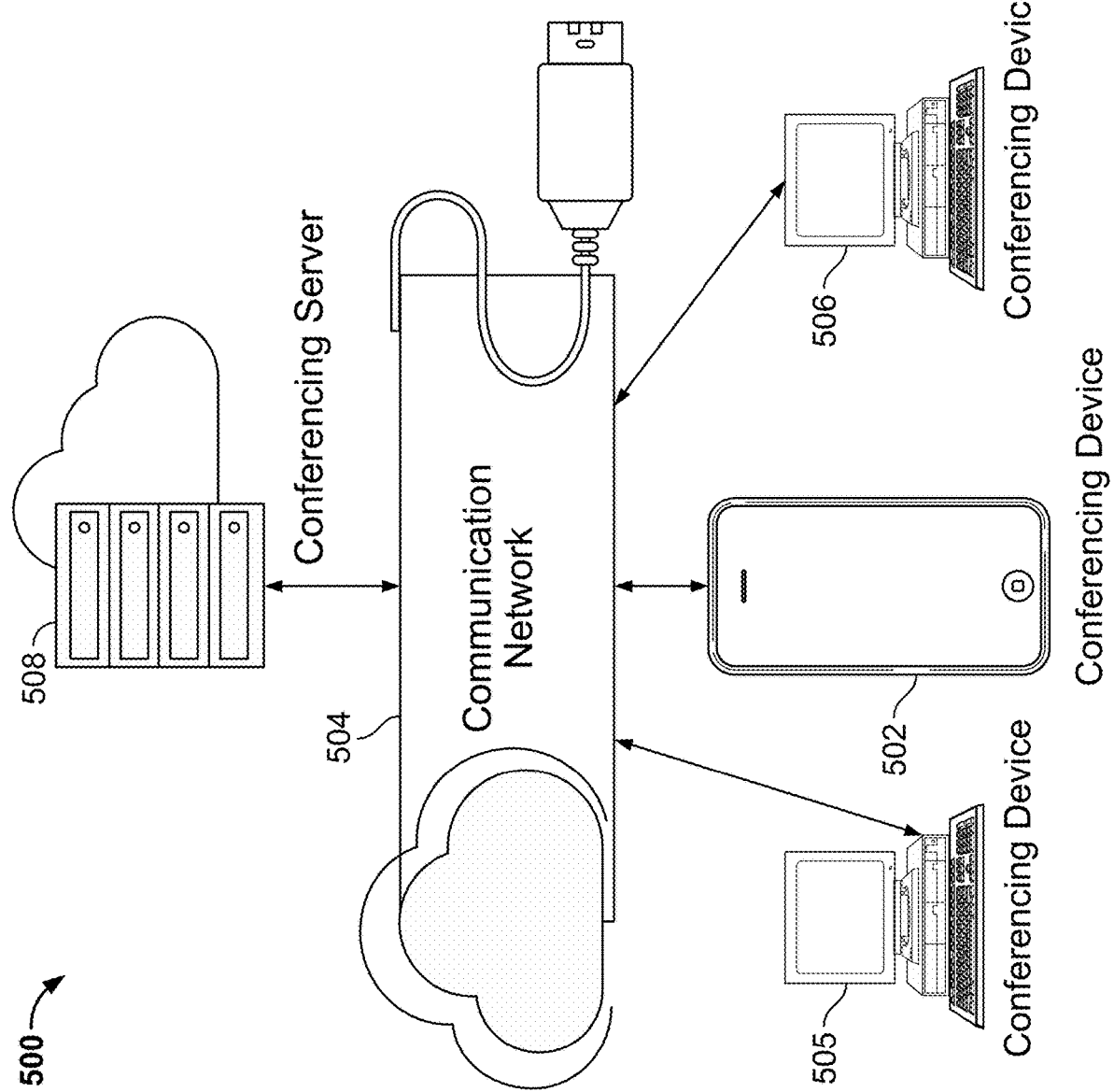
FIG. 5 is a diagram of an illustrative conferencing system, in accordance with some embodiments of this disclosure.

Conferencing device 400 and conferencing device 401 of FIG. 4 can be implemented in system 500 of FIG. 5 as any combination of conferencing device 502, conferencing device 505, or conferencing device 506. Conferencing devices, on which a conferencing system may be implemented, may function as stand-alone devices or may be part of a network of devices. Conferencing server 508 may have a similar configuration to conferencing device 401, although conferencing server 508 may not include certain elements (e.g., a display, a user interface, speakers, etc.). Various network configurations of devices may be implemented and are discussed in more detail below.

In system 500, there may be multiple conferencing devices, but only three are shown in FIG. 5 to avoid overcomplicating the drawing. In addition, each user may utilize more than one type of conferencing device and also more than one of each type of conferencing device.

Conferencing devices 502, 505, 506 may be coupled to communication network 504. Communication network 504 may be one or more networks including the Internet, a mobile phone network, mobile voice or data network (e.g., a 4G or LTE network), cable network, public switched telephone network, or other types of communications network or combinations of communications networks. Conferencing server 508, and conferencing devices 502, 505, 506 may be coupled to communications path 504 via one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths.

Although communications paths are not drawn between conferencing devices 502, 505, 506, and conferencing server 508, these devices may communicate directly with each other via communications paths, such as short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The conferencing devices may also communicate with each other through an indirect path via communication network 504.

Conferencing applications may be, for example, standalone applications implemented on conferencing devices. For example, the conferencing application may be implemented as software or a set of executable instructions, which may be stored in storage 408 and executed by control circuitry 404 of a conferencing device 502, 505, 506. In some embodiments, conferencing systems may be client-server applications where only a client application resides on the conferencing device, and a server application resides on conferencing server 508. For example, conferencing systems may be implemented partially as a client application on control circuitry 404 of conferencing devices 502, 505, 506 and partially on conferencing server 508 as a server application running on control circuitry of conferencing server 508. When executed by control circuitry of conferencing server 508, the conferencing application may instruct the control circuitry to capture audio, generate audio signatures (e.g., based on captured audio), join a device to the conference, and generate the conferencing system output (e.g., a video feed of the conference, audio feed of the conference, text chat or other functionalities for the conference, etc.) and transmit a conference ID (e.g., to a device newly joined to a conference) and the generated output to conferencing devices 502, 505, 506. The client application may instruct control circuitry of the receiving conferencing devices 502, 505, 506 to generate the conferencing system output.

Conferencing devices 502, 505, 506 may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." Cloud resources may be accessed by conferencing device 502, 505, 506 using, for example, a web browser, a conferencing system, a desktop application, a mobile application, and/or any combination of access applications of the same. Conferencing devices 502, 505, 506 may be a cloud client that relies on cloud computing for application delivery, or the conferencing device may have some functionality without access to cloud resources. For example, some applications running on conferencing device 502, 505, 506 may be cloud applications, i.e., applications delivered as a service over the Internet, while other applications may be stored and run on the conferencing device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, conferencing devices can use cloud resources for processing operations such as the processing operations performed by processing circuitry described in relation to FIG. 4.

Figure 6:
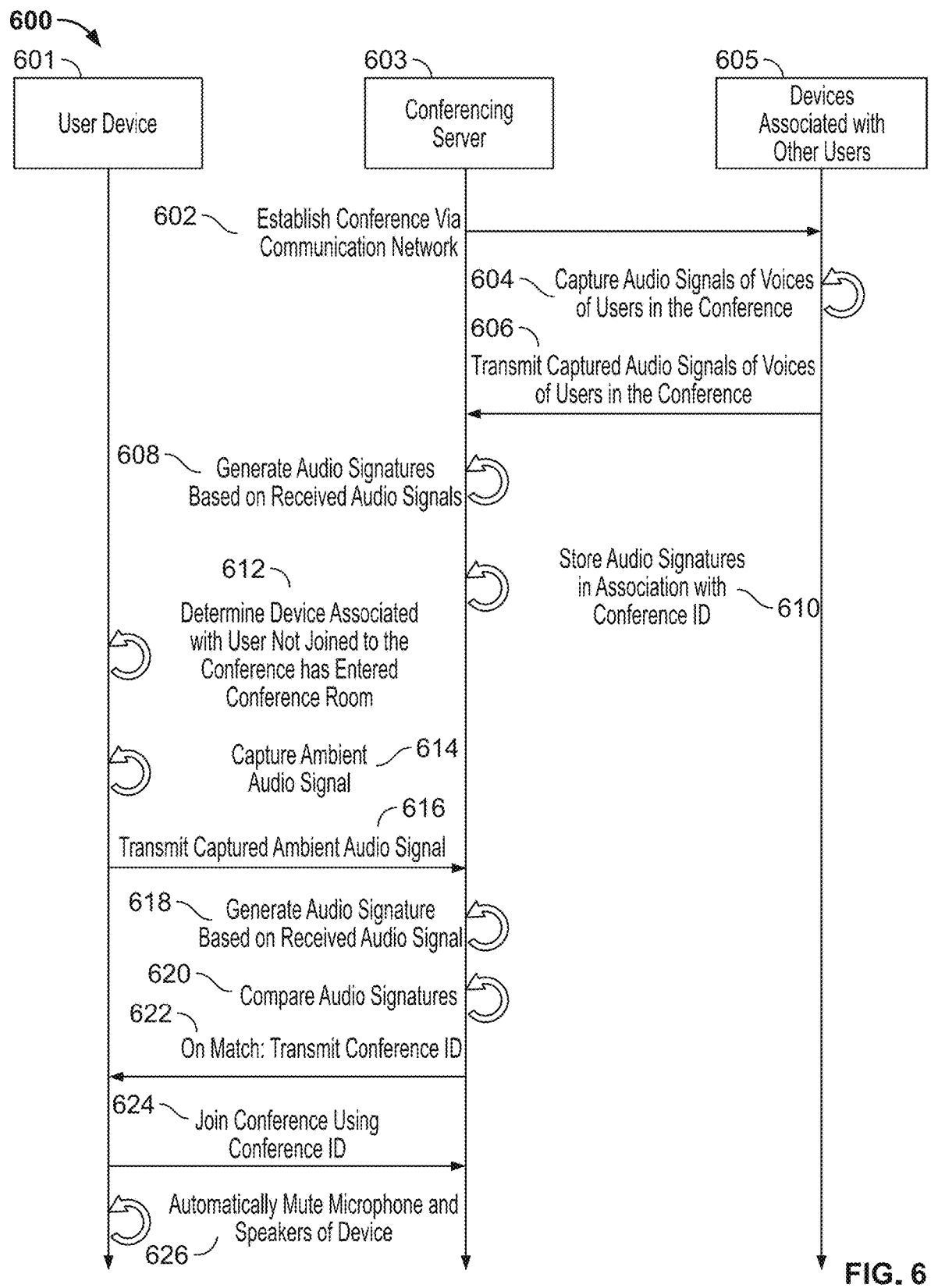
FIG. 6 is a flowchart of a detailed illustrative process for joining a device associated with a user to a conference, in accordance with some embodiments of this disclosure.

FIG. 6 shows a processing flow 600 for joining device 601 to a conference, in accordance with some embodiments of this disclosure. It should be noted that process 600 or any step thereof could be performed on, or provided by, any of the devices shown in FIGS. 4-5. For example, process 600 may be executed by devices 502, 505, 506 (e.g., via control circuitry 404) and/or control circuitry of conferencing server 508, as instructed by a conferencing application that may be implemented on conferencing device 502, and/or conferencing device 505 and/or conferencing device 506 and/or conferencing server 508, such as to distribute control of database management application operations for a target device among multiple devices. In addition, one or more steps of process 600 may be incorporated into or combined with one or more steps of any other process or embodiment (e.g., process 700 of FIG. 7).

At 602, control circuitry of a conferencing server 603 (e.g., server 508 of FIG. 5) may establish a conference (e.g., conference 105 of FIG. 1, conference 301 of FIG. 3) via a communication network (e.g., network 504 of FIG. 5). For example, conferencing server 603 may communicate with users via one or more devices 605 (e.g., devices 502, 505, 506 of FIG. 5) to set up the conference. In some embodiments, at least one of such users may be physically present in a conference room (e.g., conference room 300 of FIG. 3). The conference may include multiple participants from several different physical locations, and at any of such locations there may be a single user or multiple users present (e.g., communicating via a single device, such as device 302 of FIG. 3, in a conference room, or communicating via multiple devices). The conference may be associated with a unique conference ID stored at conferencing server 603, and such conference ID may be communicated to each of devices 605 to enable the devices 605 to join the conference.

At 604, a microphone of each of one or more devices (e.g., devices 502, 505, 506 of FIG. 5) joined to the conference may capture audio signals of voices of users in the conference. The captured audio signals (e.g., audio input 202 of FIG. 2) may be sampled at regular intervals (e.g., periods of 1-2 seconds with samples taken every few milliseconds during the period). In some embodiments, the microphone may pick up ambient sounds (e.g., voices of users in the same physical location as the microphone, voices of users joined to the conference in a different physical location, background noise, music, etc.) and certain frequencies or noise may be filtered from the signal (e.g., using digital signal processor 206 of FIG. 2 and/or control circuitry of the devices 605 or conferencing server 603). For example, noise or other background sounds may be removed from the signal, and/or only voices of users in the same room as the microphone may be included in the signal (e.g., only voices above a threshold amplitude may be included in the signal, since volume of the voice may be louder in the same physical location than over a network). An analog filter (e.g., to block signals not within a frequency of the human voice) or digital filter (e.g., by applying an algorithm to a sequence of digital samples) may be employed.

At 606, the captured audio signals may be transmitted to conferencing server 603. In some embodiments, the captured audio signal may be transmitted from each of the devices 605 joined to the conference at the same time, or at various predetermined times. The captured audio signals may be transmitted to conferencing server 603 each time the audio is sampled by the respective devices.

At 608, control circuitry of conferencing server 603 (and/or digital signal processor 206 of FIG. 2) may generate audio signatures based on the audio signals (e.g., received via I/O path 402 of FIG. 4), such as in accordance with the techniques discussed in connection with FIG. 2. For example, audio modulations of the received signals may be compressed into audio signatures. Various digital signal processing algorithms may be used (e.g., fast Fourier transform) in generating the audio signatures. In some embodiments, the audio can be converted to transcribed text (e.g., using ASR and/or speech-to-text circuitry) and such transcribed text may be used as an audio signature. The audio signature may be generated for each audio signal received by conferencing server 603 from the devices 605 joined to the conference, and audio signals may be transmitted to the server (e.g., at predetermined times, for the purposes of generating audio signatures) until the conclusion of the conference.

At 610, control circuitry of conferencing server 603 (e.g., server 508 of FIG. 5) may store (e.g., in storage 408 of FIG. 4) the generated audio signatures in connection with the conference ID associated with the conference. In addition to the conference ID, the generated signatures may be associated and/or tabulated with device IDs respectively associated with devices 605 joined to the conference, and a timestamp associated with each audio signature. In some embodiments, conferencing server 603 maintains this tabulated data (e.g., in cache or buffer memory) such that the control circuitry of conferencing server 603 can retrieve the recently generated audio signatures more quickly than audio signatures generated at an earlier time. It should be noted that conferencing server 603 may store any number of conference IDs for various ongoing conferences (e.g., within particular organizations, across multiple organizations, etc.).

At 612, control circuitry (e.g., control circuitry 404 of device 400 or 401 of FIG. 4) may determine that a user (e.g., user 310 of FIG. 3) associated with a device 601 (and not yet joined to the conference) has physically entered a conference room in which one or more devices (among devices 605) are joined to a conference established by the conferencing system. For example, techniques discussed in connection with FIG. 3 may be employed to make such a determination. In some embodiments, the device (e.g., device 311 of FIG. 3) may periodically transmit (e.g., as a push notification or a pull notification) its current location (e.g., GPS coordinates) to conferencing server 603. The control circuitry of conferencing server 603 may compare such location to the locations and/or IP addresses of one or more devices 605 joined to the conference to determine whether device 601 not yet joined to the conference is in the same physical location (e.g., conference room) as another device (among devices 605) joined to the conference.

At 614, upon the control circuitry of device 601 determining that such device is located in the same physical location as one or more devices 605 joined to a conference currently being hosted by conferencing server 603, the conferencing application causes a microphone (e.g., microphone 113 of FIG. 1) of device 601 to start capturing ambient sound. In some embodiments, the microphone may capture voices from participants in the same physical location as the user and voices of conference participants located in different locations. The microphone of device 601 may capture audio as described in 604 of FIG. 6.

At 616, device 601 may transmit (e.g., via I/O path 402 of FIG. 4) the captured ambient audio signal to conferencing server 603. In some embodiments, device 601 may transmit multiple audio signals to the conferencing server at regular intervals.

At 618, conferencing server 603 may generate an audio signature based on the audio signal received from device 601. The audio signal may be generated in a similar manner to that of 608 of FIG. 6.

At 620, control circuitry of conferencing server 603 may compare the audio signature, generated based on the audio signal received from device 601, to the audio signatures stored at conferencing server 603. In some embodiments, the comparison may be performed by control circuitry (e.g., control circuitry 404) at both conferencing server 603 and locally at device 601. As another example, the audio signatures may be stored locally at device 601, or retrieved via a network (e.g., network 504 of FIG. 5) from the conferencing server for comparison at device 601. In some embodiments, the conferencing server may retrieve the recently stored audio signatures for comparison at the outset of the comparison process, as such audio signatures may be stored in cache or buffer memory for fast retrieval (and may be more likely to have been generated in an ongoing conference).

In some embodiments, the control circuitry compares audio features or characteristics of the generated audio signature to audio features or characteristics of the stored audio signatures (e.g., a base or fundamental frequency of a voice, modulation, amplitude, or other audio characteristics). For example, conferencing server 603 (e.g., using digital signal processor 206 and/or control circuitry) may extract a first peak point with a first frequency and first average power from a first spectrogram of the generated audio signature, and extract a second peak point with a second frequency and second average power from a second spectrogram of a stored audio signature. Conferencing server 603 may determine a frequency difference value between the first frequency and the second frequency and a power difference value between the first average power and the second average power. Based on the comparing, conferencing server 603 may determine whether the generated audio signature matches any of the stored audio signatures. For example, the generated audio signature may be determined to match a stored audio signature if the frequency difference value is under a first threshold (e.g., 100 Hz) and the power difference value is under a second threshold (e.g., 20 dB). In some embodiments, conferencing server 603 may compare respective features vectors which may constitute the audio signature, and determine a match based on whether a similarity between such features vectors is within a certain threshold.

In some embodiments, the comparison between the generated audio signature received from device 601 and the stored audio signatures may include audio analysis techniques to determine whether there is match between voices of particular users (e.g., frequency analysis to determine a base frequency and unique harmonic pattern of a particular voice, phoneme analysis to determine an accent of a particular voice, etc.). For example, the control circuitry may determine that there is a match if a similarity score computed by the control circuitry exceeds a predetermined threshold. Phoneme analysis is described in greater detail in Mehra, U.S. Pat. No. 10,621,970, issued Apr. 14, 2020, and Venkataraman et al., U.S. Pat. No. 10,324,940, issued Jun. 18, 2019, which are hereby incorporated by reference herein in their entireties.

At 622, the control circuitry (e.g., of conferencing server 508 of FIG. 5) may determine that there is a match between the audio signature generated based on the audio signal transmitted by device 601 and one or more of the audio signatures transmitted at 606. For example, certain audio characteristics between the audio signatures may be sufficiently similar (e.g., within a certain threshold, such as after weighting and normalizing is performed) to each other to determine that there is a match. In some embodiments, the control circuitry may determine that there is not a match with audio signatures related to other ongoing conferences prior to determining the matched conference (e.g., conference 105 of FIG. 1. Upon determining that there is a match, the control circuitry of conferencing server 603 may transmit the conference ID associated with the conference to device 601.

At 624, device 601 may be automatically joined to the ongoing conference using the conference ID received from conferencing server 603. In some embodiments, the user may be automatically joined to the conference (e.g., without further user input). As another example, the control circuitry may generate for presentation a selectable prompt to join the conference, and the user may be joined to the conference when selection of the prompt is received.

At 626, since there may be other devices in the same physical conference room as the user associated with device 601, the microphone and/or speakers and/or video feed of device 601 may be automatically muted and/or disabled (e.g., without further user input) in order to avoid audio feedback. An icon (e.g., indicator 312 of FIG. 3 or other indicia) associated with user 601 may be generated (e.g., by control circuitry 404 of FIG. 4 of the device associated with the user or conferencing server 603) for presentation on a display (e.g., projector 304 of FIG. 3) to indicate to other conference participants that the user is now participating in the conference (e.g., via devices 605 in the physical conference room already joined to the conference). Accordingly, irritating audio feedback can be minimized or avoided, and the user may conveniently join the ongoing conference, while the system makes the other participants aware that the user has joined the conference. In some embodiments, upon the user joining the conference, various supplemental features may be made available (e.g., screensharing capabilities, text or chat capabilities, etc.).

Figure 7:
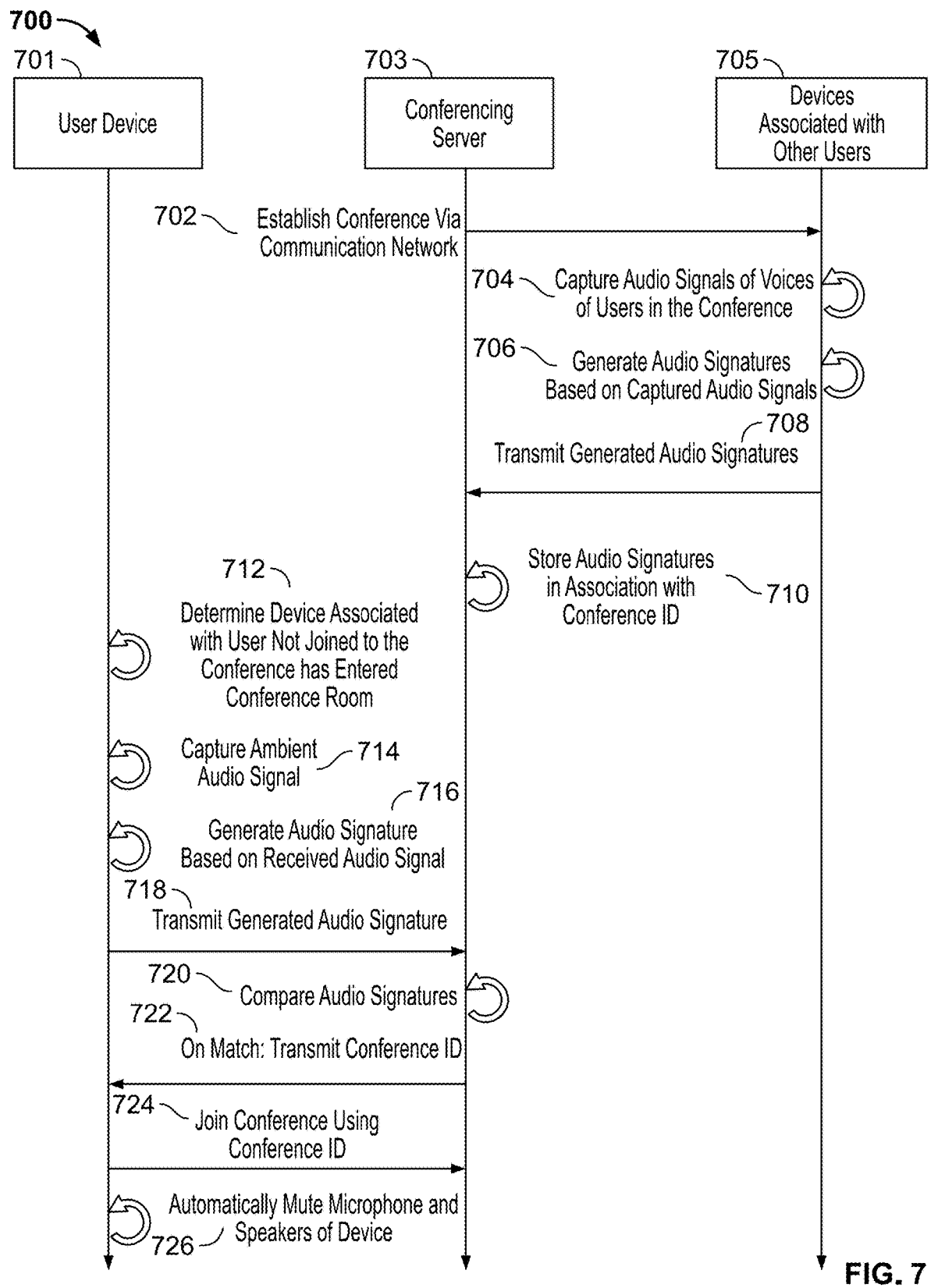
FIG. 7 is a flowchart of a detailed illustrative process for joining a device associated with a user to a conference, in accordance with some embodiments of this disclosure.

FIG. 7 shows a processing flow 700 for joining device 701 to a conference, in accordance with some embodiments of this disclosure. It should be noted that process 700 or any step thereof could be performed on, or provided by, any of the devices shown in FIGS. 4-5. For example, process 700 may be executed by devices 502, 505, 506 of FIG. 5 (e.g., via control circuitry 404) and/or control circuitry of conferencing server 508, as instructed by a conferencing application that may be implemented on conferencing device 502, and/or conferencing device 505 and/or conferencing device 506 and/or conferencing server 508, such as to distribute control of database management application operations for a target device among multiple devices. In addition, one or more steps of process 700 may be incorporated into or combined with one or more steps of any other process or embodiment (e.g., process 600 of FIG. 6).

At 702, conferencing server 703 may establish a conference via a communication network (e.g., communication network 504 of FIG. 5) in a similar manner to that of 602 of FIG. 6. At 704, a microphone of each of devices 705 joined to the conference may capture audio signals of voices of users in the conference, in a similar manner to 604 of FIG. 6.

At 706, one or more devices 705 (e.g., devices 502, 505, 506 of FIG. 5) joined to the conference may generate (e.g., via control circuitry 404 of FIG. 4) respective audio signatures based on the audio signals captured at the respective devices 705. Each of the devices 705 may generate the audio signatures in a similar manner to that of 608 of FIG. 6, and in accordance with the techniques discussed in connection with FIG. 2.

At 708, each of devices 705 may transmit (e.g., via I/O path 402 of FIG. 4) the generated audio signatures to conferencing server 703. In some embodiments, the generated audio signatures may be transmitted from each of the devices 705 joined to the conference at the same time, or at staggered times. For example, the generated audio signatures may be transmitted to conferencing server 703 each time the audio is sampled by the respective devices 705 (e.g., upon completion of generation of the audio signatures).

At 710, conferencing server 703 may receive (e.g., via I/O path 402 of FIG. 4) the generated audio signatures, and control circuitry of the conferencing server (e.g., server 508 of FIG. 5) may store (e.g., in storage 408 of FIG. 4) the generated audio signatures in connection with the conference ID associated with the conference. In addition to the conference ID, the generated signatures may be associated and/or tabulated with device IDs respectively associated with devices 705 joined to the conference, and a timestamp associated with each audio signature. In some embodiments, conferencing server 703 maintains this tabulated data (e.g., in cache or buffer memory) such that the control circuitry of conferencing server 703 can retrieve the recently generated audio signatures more quickly than audio signatures generated at an earlier time. It should be noted that conferencing server 703 may store any number of conference IDs for various ongoing conferences (e.g., within particular organizations, across multiple organizations, etc.).

At 712, control circuitry (e.g., control circuitry 404 of device 400 or 401 of FIG. 4) may determine that a user (e.g., user 311 of FIG. 3) associated with device 701 has physically entered a conference room in which one or more devices are joined to a conference established by the conferencing system. For example, techniques discussed in connection with FIG. 3 may be employed to make such a determination, and in a similar manner to that of 612 of FIG. 6.

At 714, upon control circuitry (e.g., control circuitry 404 of FIG. 4) of the device 701 determining that such device is located in the same physical location as one or more devices joined to a conference currently being hosted by conferencing server 703, the conferencing application causes a microphone (e.g., microphone 113 of FIG. 1) of the device to start capturing ambient sound. In some embodiments, the microphone may capture voices from participants in the same physical location as the user and voices of conference participants located in different locations. The microphone of the device may capture audio as described in connection with 604 of FIG. 6.

At 716, the device 701 may generate (e.g., via control circuitry 404 of FIG. 4) one or more audio signatures based on the audio signals captured at the device. Such device may generate the audio signatures in a similar manner to 608 of FIG. 6, and such as in accordance with the techniques discussed in connection with FIG. 2.

At 718, the device may transmit (e.g., via I/O path 402 of FIG. 4) the generated audio signature to conferencing server 703. In some embodiments, the device may transmit multiple audio signals to conferencing server 703 at regular intervals.

At 720, control circuitry (e.g., of the conferencing server) may compare one or more audio signatures received from the device 701 to the audio signatures stored at the conferencing server. Such comparison may be performed in a similar manner to 620 of FIG. 6.

At 722, the control circuitry (e.g., of conferencing server 508 of FIG. 5) may determine that there is a match between the audio signature generated by the device 701 and the audio signatures generated by the devices already joined to the conference (e.g., conference 301 of FIG. 3). Upon determining that there is a match, the control circuitry of conferencing server 703 may transmit the conference ID associated with the conference to the device 701.

At 724, the device 701 may be automatically joined to the ongoing conference using the conference ID received from conferencing server 703. In some embodiments, the user may be automatically joined to the conference (e.g., without further user input). As another example, the control circuitry may generate for presentation a selectable prompt to join the conference, and the user may be joined to the conference when selection of the prompt is received.

At 726, since there may be other devices (among devices 705) in the same physical conference room as the user associated with device 701 now joined to the conference, the microphone and/or speakers and/or video feed of such device may be automatically muted and/or disabled (e.g., without further user input) in order to avoid audio feedback. An icon (e.g., indicator 312 or other indicia) associated with the user may be generated (e.g., by control circuitry 404 of the device 701 or conferencing server 703) for presentation on a display (e.g., projector 304 of FIG. 3) to indicate to other conference participants that the user is now participating in the conference (e.g., via a device in the physical conference room already joined to the conference). Accordingly, irritating audio feedback can be minimized or avoided, and the user may conveniently join the ongoing conference, while the system makes the other participants aware that the user has joined the conference. In some embodiments, upon the user joining the conference, various supplemental features may be made available (e.g., screen-share, meeting chat, etc.).

Those of skill in the art would appreciate that the various illustrative logical blocks, modules, circuits, and algorithm steps described in connection with the embodiments disclosed herein may be implemented with electronic hardware, computer software, or combinations of both. To illustrate this interchangeability of hardware and software, various illustrative components, blocks, modules, circuits, and steps have been described above generally in terms of their functionality. Whether such functionality is implemented as hardware or software may depend upon the particular application and design constraints imposed on the overall system. Skilled artisans may implement the described functionality in varying ways for each particular application, but such implementation decisions should not be interpreted as causing a departure from the scope of the present invention. Moreover, method steps may be interchanged without departing from the scope of the invention.

The various illustrative logical blocks, modules, and circuits described in connection with the embodiments disclosed herein may be implemented or performed with a general purpose processor, a digital signal processor (DSP), an application specific integrated circuit (ASIC), a field-programmable gate array (FPGA) or other programmable logic device, discrete gate or transistor logic, discrete hardware components, or any combination thereof designed to perform the functions described herein. A general purpose processor may be a microprocessor, but in the alternative, the processor as described herein may be any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such that the processor reads information from, and writes information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein. Thus, one of ordinary skill in the art would understand that the invention is not to be limited by the foregoing illustrative details, but rather is to be defined by the appended claims.

What is claimed is:

1. A method comprising:
generating, by a conferencing server, a first audio signature based on voices of a plurality of users in an on-going conference;
storing the first audio signature;
determining that a device, associated with a first user and not currently joined to the on-going conference, should be joined to the on-going conference by:
determining that the first user associated with the device has been invited to join the on-going conference and that the device is within a threshold distance of a device associated with at least one user of the plurality of users in the on-going conference;
causing a microphone of the device associated with the first user to capture an ambient sound sample;
receiving, by the conferencing server, the ambient sound sample captured by the microphone of the device associated with a first user;
generating, by the conferencing server, a second audio signature based on the received ambient sound sample;
comparing the first audio signature generated based on the voices of the plurality of users in the on-going conference to the second audio signature generated based on the ambient sound sample captured by the microphone of the device associated with the first user when the device is not joined to the on-going conference;

in response to determining that first audio signature matches the second audio signature, determining that the device associated with the first user should be joined to the on-going conference; and joining the device associated with the first user to the on-going conference.

2. The method of claim 1, wherein the ambient sound sample captured by the microphone of the device associated with the first user comprises at least one of the voices of the plurality of users in the on-going conference.

3. The method of claim 2, further comprising:
determining whether the device associated with the first user is in a same physical location as a device associated with the at least one user of the plurality of users in the on-going conference; and
wherein the ambient sound sample is captured by the microphone of the device associated with the first user in response to determining that the device associated with the first user is in the same physical location as the device associated with the at least one user.

4. The method of claim 1, wherein joining the device associated with the first user to the on-going conference comprises generating for presentation an icon indicating to each user joined to the on-going conference that the first user is joined to the on-going conference.

5. The method of claim 1, further comprising:
after joining the device associated with the first user to the on-going conference, causing the microphone and a speaker of the device associated with the first user to be automatically muted without receiving a user command to mute the microphone and the speaker.

6. The method of claim 1, further comprising:
assigning, by the conferencing server, a conference identifier to the on-going conference, wherein the first audio signature is associated with the conference identifier;
wherein joining the device associated with the first user to the on-going conference comprises transmitting the conference identifier to the device associated with the first user.

7. The method of claim 1, wherein the first audio signature and the second audio signature are generated by sampling the voices of the plurality of users in the on-going conference and the ambient sound sample captured by the microphone, respectively, at regular intervals.

8. The method of claim 1, wherein the first audio signature and the second audio signature are generated by transcribing the voices of the plurality of users in the on-going conference and the ambient sound sample captured by the microphone, respectively, into text.

9. A system comprising:
control circuitry configured to:
generate a first audio signature based on voices of a plurality of users in an on-going conference;
storage circuitry configured to:
store the first audio signature;
input-output (I/O) circuitry configured to:
receive an ambient sound sample captured by a microphone of a device associated with a first user, wherein the device is not joined to the on-going conference; and
the control circuitry is further configured to:
determine that the device, associated with the first user and not currently joined to the on-going conference, should be joined to the on-going conference by:
determine that the first user associated with the device has been invited to join the on-going conference and that the device is within a threshold distance of a device associated with at least one user of the plurality of users in the on-going conference;
causing the microphone of the device associated with the first user to capture the ambient sound sample;
generating a second audio signature based on the received ambient sound sample;
comparing the first audio signature generated based on the voices of the plurality of users in the on-going conference to the second audio signature generated based on the ambient sound sample captured by the microphone of the device associated with the first user when the device is not joined to the on-going conference;
in response to determining that first audio signature matches the second audio signature, determining that the device associated with the first user should be joined to the on-going conference; and
join the device associated with the first user to the on-going conference.

10. The system of claim 9, wherein the ambient sound sample captured by the microphone of the device associated with the first user comprises at least one of the voices of the plurality of users in the on-going conference.

11. The system of claim 10, wherein the control circuitry is further configured to:
determine whether the device associated with the first user is in a same physical location as a device associated with the at least one user of the plurality of users in the on-going conference; and
wherein the ambient sound sample is captured by the microphone of the device associated with the first user in response to determining that the device associated with the first user is in the same physical location as the device associated with the at least one user.

12. The system of claim 9, wherein in joining the device associated with the first user to the on-going conference, the control circuitry is further configured to generate for presentation an icon indicating to each user joined to the on-going conference that the first user is joined to the on-going conference.

13. The system of claim 9, wherein the control circuitry is further configured to:
after joining the device associated with the first user to the on-going conference, cause the microphone and a speaker of the device associated with the first user to be automatically muted without receiving a user command to mute the microphone and the speaker.

14. The system of claim 9, wherein the control circuitry is further configured to:
assign a conference identifier to the on-going conference, wherein the first audio signature is associated with the conference identifier;
wherein in joining the device associated with the first user to the on-going conference, the control circuitry is further configured to transmit the conference identifier to the device associated with the first user.

15. The system of claim 9, wherein the control circuitry is configured to, in generating the first audio signature and the second audio signature, sample the voices of the plurality of users in the on-going conference and the ambient sound sample captured by the microphone, respectively, at regular intervals.

16. The system of claim 9, wherein the control circuitry is configured to, in generating the first audio signature and the second audio signature, transcribe the voices of the plurality of users in the on-going conference and the ambient sound sample captured by the microphone, respectively, into text.

17. A method comprising:
generating a first audio signature based on voices of a plurality of users in an on-going conference;
storing the first audio signature;
determining that a device, associated with a first user and not currently joined to the on-going conference, should be joined to the on-going conference by:
  determining that the first user associated with the device has been invited to join the on-going conference and that the device is within a threshold distance of a device associated with at least one user of the plurality of users in the on-going conference;
  causing a microphone of the device associated with the first user to capture an ambient sound sample;
  receiving, by a conferencing server, a second audio signature, wherein:
    the second audio signature was generated by the device associated with the first user based on the ambient sound sample captured by the microphone of the device associated with the first user when the device associated with the first user was not joined to the on-going conference;
  comparing the first signature generated based on the voices of the plurality of users in the on-going conference and stored by the conferencing server to the received second audio signature generated based on ambient sound sample captured by the microphone of the device associated with the first user when the device is not joined to the on-going conference; and
  in response to determining that first audio signature matches the second audio signature, determining that the device associated with the first user should be joined to the ongoing conference; and
joining the device associated with the first user to the on-going conference.

18. The method of claim 17, wherein the ambient sound sample captured by the microphone of the device associated with the first user comprises at least one of the voices of the plurality of users in the on-going conference.

19. The method of claim 18, further comprising:
determining whether the device associated with the first user is in a same physical location as a device associated with at least one user of the plurality of users in the on-going conference; and
wherein the ambient sound sample is captured by the microphone of the device associated with the first user in response to determining that the device associated with the first user is in the same physical location as the device associated with the at least one user.

20. The method of claim 17, further comprising:
after joining the device associated with the first user to the on-going conference, causing the microphone and a speaker of the device associated with the first user to be automatically muted without receiving a user command to mute the microphone and the speaker.

* * * * *

UNITED STATES PATENT AND TRADEMARK OFFICE
CERTIFICATE OF CORRECTION

PATENT NO. : 11,516,347 B2
APPLICATION NO. : 16/916904
DATED : November 29, 2022
INVENTOR(S) : Srikanth Channapragada et al.

Page 1 of 1

It is certified that error appears in the above-identified patent and that said Letters Patent is hereby corrected as shown below:

In the Claims

In Claim 1, Column 18, Line 60, please delete "a" and replace it with --the--.

Signed and Sealed this
Fourteenth Day of January, 2025

Derrick Brent
*Acting Director of the United States Patent and Trademark Office*